US008955059B2

(12) United States Patent
Hsu

(10) Patent No.: US 8,955,059 B2
(45) Date of Patent: Feb. 10, 2015

(54) AUTHENTICATION SYSTEM, AUTHENTICATION METHOD, AND NETWORK STORAGE APPLIANCE

(71) Applicant: QSAN Technology, Inc., Taipei (TW)

(72) Inventor: Chin-Hsing Hsu, Taipei (TW)

(73) Assignee: QSAN Technology, Inc., Taipei (TW)

(*) Notice: Subject to any disclaimer, the term of this patent is extended or adjusted under 35 U.S.C. 154(b) by 31 days.

(21) Appl. No.: 13/762,381

(22) Filed: Feb. 8, 2013

(65) Prior Publication Data

US 2013/0219472 A1    Aug. 22, 2013

Related U.S. Application Data

(60) Provisional application No. 61/599,952, filed on Feb. 17, 2012.

(30) Foreign Application Priority Data

Apr. 11, 2012 (TW) .............................. 101112819 A

(51) Int. Cl.
  H04L 29/00    (2006.01)
  H04L 29/06    (2006.01)
(52) U.S. Cl.
  CPC .......... H04L 63/08 (2013.01); H04L 63/0815 (2013.01)
  USPC .................................. 726/4; 714/1; 713/183
(58) Field of Classification Search
  USPC .................................. 726/4; 714/1; 713/183
  See application file for complete search history.

(56) References Cited

U.S. PATENT DOCUMENTS

| 6,292,904 B1* | 9/2001 | Broomhall et al. ............... 714/1 |
| 8,245,050 B1* | 8/2012 | Subramanian et al. ....... 713/183 |
| 2005/0125503 A1 | 6/2005 | Iyengar et al. |
| 2010/0211999 A1 | 8/2010 | Grobman |

FOREIGN PATENT DOCUMENTS

| CN | 101569217 | 10/2009 |
| TW | 200509641 | 3/2005 |
| TW | 201038039 | 10/2010 |

OTHER PUBLICATIONS

"Office Action of Taiwan Counterpart Application", issued on Jul. 29, 2014, p.1-p.12.

* cited by examiner

*Primary Examiner* — Brandon Hoffman
*Assistant Examiner* — Michael D Anderson
(74) *Attorney, Agent, or Firm* — Jianq Chyun IP Office

(57) ABSTRACT

An authentication system, an authentication method, and a network storage appliance are provided. The authentication system includes a client electronic device, the network storage appliance having an authentication proxy, and a directory server having an authentication service module and an account database. The client electronic device selects a data access service and transmits an encrypted data and a user data to the network storage appliance. The authentication proxy packs the encrypted data and the user data into an authentication login information and transmits the authentication login information to the directory server. The authentication service module receives the authentication login information and performs decryption and comparison on the authentication login information according to a corresponding authentication protocol and a corresponding account information in the account database, so as to determine whether the authentication is successful. Then, the authentication service module transmits an authentication response to the network storage appliance.

20 Claims, 6 Drawing Sheets

AUTHENTICATION SYSTEM, AUTHENTICATION METHOD, AND NETWORK STORAGE APPLIANCE

CROSS-REFERENCE TO RELATED APPLICATION

This application claims the priority benefits of U.S. provisional application Ser. No. 61/599,952, filed on Feb. 17, 2012 and Taiwan application serial no. 101112819, filed on Apr. 11, 2012. The entirety of each of the above-mentioned patent applications is hereby incorporated by reference herein and made a part of this specification.

BACKGROUND OF THE INVENTION

1. Field of the Invention

The invention generally relates to an authentication technique, and more particularly, to a system and a method which carry out a unified authentication by a network storage appliance.

2. Description of Related Art

Nowadays, local area networks (LANs) are broadly deployed. By setting up a network storage appliance connected to computer devices inside an enterprise, the computer devices can access files or data stored in the network storage appliance through LAN connections. Moreover, the network storage appliance allows heterogeneous platforms or clients and servers within a system to share files. For the security of data access, a user has to log into a network storage appliance by using authorized ID and password. Because different data access techniques adopt different authentication protocols, a network storage appliance has to use different account databases to carry out ID/password authentication.

FIG. 1 is a diagram of an authentication system. The authentication system 100 includes an Internet Small Computer System Interface (iSCSI) initiator 112, a Common Internet File System (CIFS) client 114, a network storage appliance 120, and a directory server 130. When the iSCSI initiator 112 sends a connection request to the iSCSI target 122 through a data flow 1, the iSCSI target 122 sends an authentication comparison request to a local account database 126 of the network storage appliance 120 through a data flow 2. When the CIFS client 114 sends a connection request to the CIFS server 124 through a data flow 4, the CIFS server 124 has to send an authentication comparison request to a remote account database 132 of the directory server 130 through a data flow 5.

This creates an in-consistent usage paradigm for most of network storage appliance. When a user uses different data access protocols provided by the network storage appliance 120, the user may be authenticated by different account databases of the network storage appliance 120. When the user changes his/her password, the user does not know whether he/she changes data in the local account database 126 or data in the remote account database 132. When the account information of the user is out of synchronization between the local account database 126 and the remote account database 132, the user is prone to input incorrect ID/password so that the authentication may be failed and the user may be prohibited from accessing any data. In addition, it is very time-consuming and inconvenient for a network system administrator to maintain the account information in both the local account database 126 and the remote account database 132.

SUMMARY OF THE INVENTION

Accordingly, the invention is directed to an authentication system and an authentication method thereof, in which regardless of which type of data access service is selected, a user can perform the login authentication action by using the same ID and password.

The invention is directed to a network storage appliance which allows a user to determine whether to perform authentication comparison by using a remote account database only or a local account database only.

The invention provides an authentication system including a client electronic device, a network storage appliance having an authentication proxy, and a directory server having an authentication service module and an account database. The client electronic device selects a data access service and transmits a first encrypted data and a user data required by the authentication protocol to the network storage appliance. The authentication proxy of the network storage appliance packs the first encrypted data and the user data into an authentication login information and transmits the authentication login information to the directory server. The authentication service module of the directory server receives the authentication login information and performs decryption and comparison according to a corresponding authentication protocol and a corresponding account information in the account database, so as to determine whether the authentication is successful, and then the authentication service module transmits an authentication response to the network storage appliance.

According to an embodiment of the invention, the client electronic device further transmits an authentication request to the network storage appliance. The network storage appliance receives the authentication request, selects an authentication protocol according to the authentication request, and transmits one or a plurality of parameters required by the authentication protocol to the client electronic device.

According to an embodiment of the invention, the client electronic device encrypts the parameters and a password input by a user by using a hashing algorithm, so as to generate the first encrypted data, wherein the authentication proxy of the network storage appliance packs the first encrypted data, the parameters, and the user data into the authentication login information and transmits the authentication login information to the directory server.

According to an embodiment of the invention, the authentication service module selects a password corresponding to the user data from the account database and encrypts the parameters and the password by using the same hashing algorithm, so as to generate a second encrypted data, and the authentication service module determines whether the authentication is successful by comparing the first encrypted data with the second encrypted data.

According to an embodiment of the invention, if the authentication service module determines that the first encrypted data is the same as the second encrypted data, the authentication service module transmits a positive response to the network storage appliance, and if the authentication service module determines that the first encrypted data is different from the second encrypted data, the authentication service module transmits a negative response to the network storage appliance.

According to an embodiment of the invention, the data access service includes one of Internet Small Computer System Interface (iSCSI), Common Internet File System (CIFS), File Transfer Protocol (FTP), Apple Filing Protocol (AFP), HyperText Transfer Protocol (HTTP), or Network File System (NFS).

According to an embodiment of the invention, the directory server is an active directory (AD) server of a Microsoft Windows operating system.

According to an embodiment of the invention, the authentication protocol includes one of Challenge-Handshake Authentication Protocol (CHAP), Kerberos Protocol, New Technology LAN Manager (NTLM), Digest Access Authentication, clear-text password, or encrypted password.

The invention also provides a network storage appliance including an authentication proxy. The authentication proxy packs an encrypted data and a user data from a client electronic device into an authentication login information and transmits the authentication login information to a directory server. Besides, the authentication proxy receives an authentication response indicating whether the authentication is successful from the directory server and transmits an authentication result to the client electronic device.

According to an embodiment of the invention, the network storage appliance further includes one or more file servers coupled to the authentication proxy. The file servers are configured to receive the encrypted data and the user data required by the authentication according to a data access service selected by the client electronic device and transmits the encrypted data and the user data to the authentication proxy to be packed.

According to an embodiment of the invention, the network storage appliance is a storage device adopting the network attached storage (NAS) technique.

The invention further provides an authentication method adapted to an authentication system, wherein the authentication system includes a client electronic device, a network storage appliance, and a directory server. The authentication method includes following steps. An authentication proxy is disposed in the network storage appliance, and an authentication service module and an account database are disposed in the directory server. A data access service is selected and an encrypted data and a user data required by the authentication are transmitted to the network storage appliance by the client electronic device. The encrypted data and the user data are packed into an authentication login information and the authentication login information is transmitted to the directory server by the authentication proxy of the network storage appliance. The authentication login information is received by the authentication service module of the directory server, wherein the authentication service module performs decryption and comparison according to a corresponding authentication protocol and a corresponding account information in the account database to determine whether the authentication is successful, and then the authentication service module transmits an authentication response to the network storage appliance.

As described above, the invention provides an authentication system and an authentication method. The authentication system provided by the invention can perform authentication comparison on different types of data access services by using a single account database through the operations of the authentication proxy in the network storage appliance and the authentication service module in the directory server.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
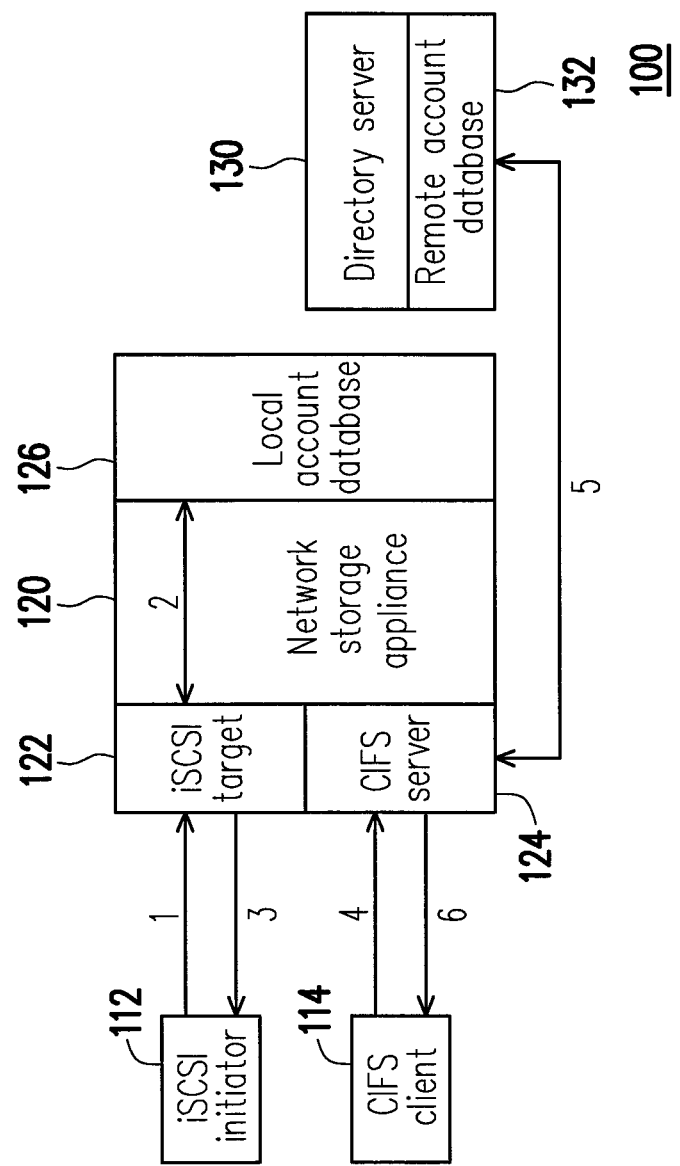
FIG. 1 is a diagram of an authentication system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
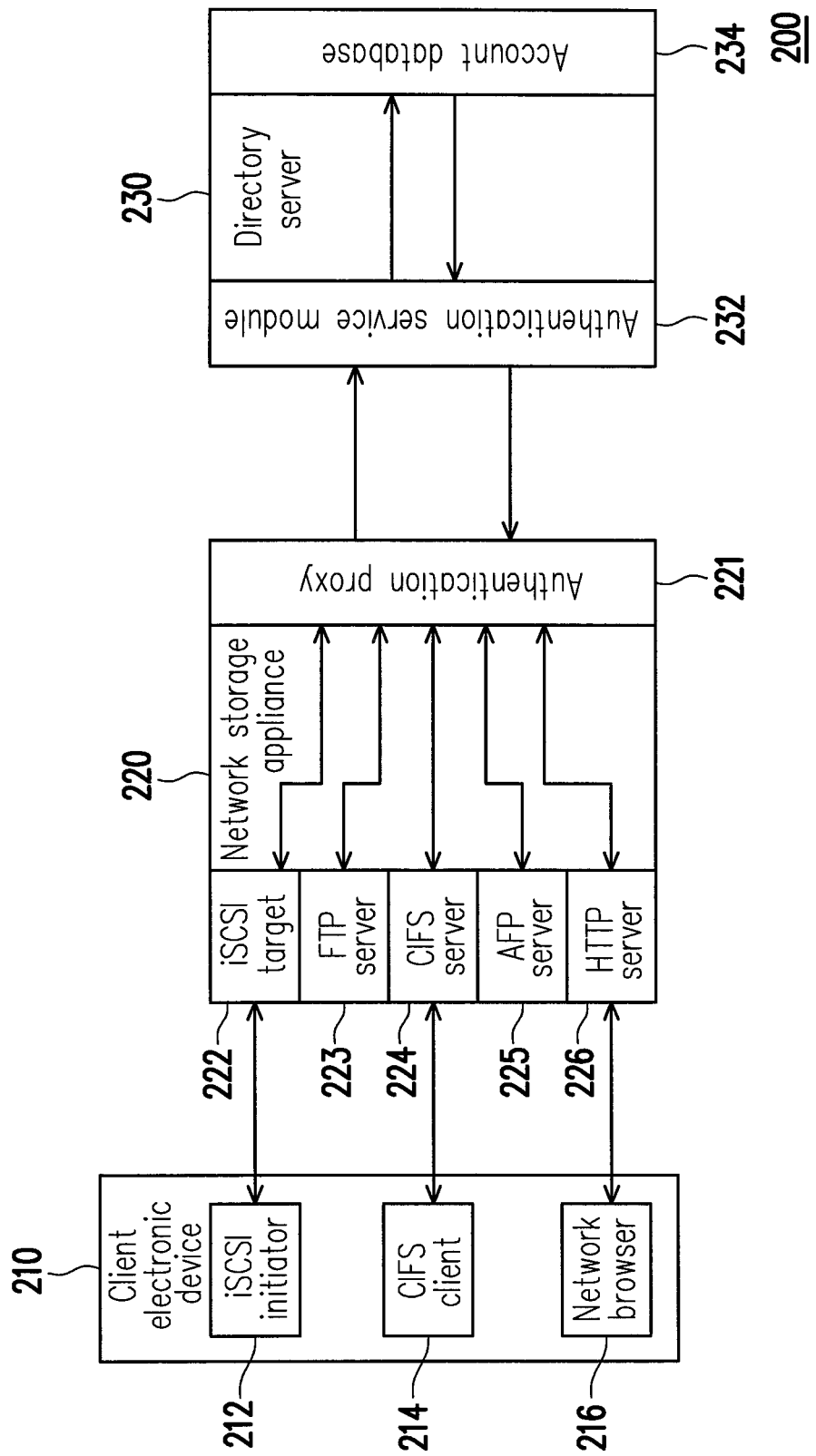
FIG. 2 is a block diagram of an authentication system according to an embodiment of the invention.

FIG. 2 is a block diagram of an authentication system according to an embodiment of the invention. Referring to FIG. 2, the authentication system 200 includes a client electronic device 210, a network storage appliance 220, and a directory server 230. The functions of aforementioned components will be respectively explained below.

The client electronic device 210 is, for example, a personal computer (PC), a notebook computer, a tablet PC, or a workstation that can be connected to the network storage appliance 220 through an Ethernet connection. However, the type of the client electronic device 210 is not limited herein. The client electronic device 210 can transmit files or data through different data access services. However, the client electronic device 210 has to perform an authentication operation before transmitting files or data. Aforementioned data access services include Internet Small Computer System Interface (iSCSI), Common Internet File System (CIFS), File Transfer Protocol (FTP), Apple Filing Protocol (AFP), HyperText Transfer Protocol (HTTP), and Network File System (NFS), etc. The scope of the data access services is not limited in the invention.

The network storage appliance 220 is a storage appliance adopting the network attached storage (NAS) technique. NAS is a data storage protocol used on the Ethernet for managing data flows on local area networks (LANs) based on the Internet Protocol (IP) through specific file servers, and which allows different types of servers, clients, and workstations to share files and data. At least one hard disc (not shown) is installed in the network storage appliance 220, and an operating system for NAS file servers is installed in the hard disc. In the present embodiment, the network storage appliance 220 includes an authentication proxy 221 and a plurality of file servers. The file servers are respectively an iSCSI target 222, a FTP server 223, a CIFS server 224, an AFP server 225, and a HTTP server 226.

The directory server 230 is connected to the network storage appliance 220 through an Ethernet connection. The directory server 230 works with a Windows, Linux, Unix, or Netware operating system. However, the invention is not limited thereto. In the present embodiment, the directory server 230 further includes an authentication service module 232 and an account database 234.

As shown in FIG. 2, the client electronic device 210 selects one of the iSCSI initiator 212, the CIFS client 214 or the network browser 216 to transmit a first encrypted data and a user data required by the authentication to the network storage appliance 220. The network storage appliance 220 receives the first encrypted data and the user data through the corresponding iSCSI target 222, the CIFS server 224, and the HTTP server 226. Herein the user data is, for example, a user name, and the first encrypted data varies with the adopted authentication protocol. In an embodiment, the first encrypted data is the encrypted data of a password input by a user.

The corresponding file server in the network storage appliance 220 first transmits the first encrypted data and the user data to the authentication proxy 221 to be packed. The authentication proxy 221 packs the first encrypted data, the user data, and other parameters required by the authentication into an authentication login information according to the adopted authentication protocol and transmits the authentication login information to the directory server 230. The authentication service module 232 of the directory server 230 receives the authentication login information and performs decryption and comparison according to a corresponding authentication protocol and a corresponding account information in the account database to determine whether the authentication is successful. After that, the authentication service module 232 transmits an authentication response to the network storage appliance 220.

It should be noted that with different authentication protocols, the authentication proxy 221 generates the authentication login information with different data. The authentication protocol includes Challenge-Handshake Authentication Protocol, Kerberos Protocol, New Technology LAN Manager (NTLM), Digest Access Authentication, clear-text password, or encrypted password. However, the invention is not limited thereto. Correspondingly, the authentication service module 232 of the directory server 230 selects a suitable authentication protocol and the corresponding account information in the account database by means of judging the content of the authentication login information, so as to perform the decryption and comparison action. The data access services, authentication protocols, content of authentication login information, and the authentication protocols thereof are listed in following table 1 according to an embodiment of the invention.

TABLE 1

| Data Access Service | Authentication Protocol | Content of Authentication Login Information | Authentication Package of Authentication Service Module |
|---|---|---|---|
| iSCSI | CHAP | User name, CHAP ID, Challenge, CHAP Response | Microsoft Remote Access Authentication Package |
| CIFS | Kerberos | User information, Kerberos ticket | Microsoft Kerberos Authentication Package |
| CIFS | NTLM | User name, NTLM challenge, NTLM response | Microsoft NetLogon Service |
| HTTP | Digest Access Authentication | User information, Uniform Resource Identifier (URI), and Nonce, etc | Microsoft Digest Authentication Package |

Referring to table 1, the directory server 230 in the present embodiment is an active directory (AD) server of a Microsoft Windows operating system. Thus, the authentication service module 232 selects different authentication packages according to different authentication protocols. Regarding the CIFS data access service, the network storage appliance 220 selects one of the Kerberos authentication protocol or the NTLM authentication protocol. Below, the invention will be described by taking the iSCSI and CIFS data access services as an example.

Figure 3:
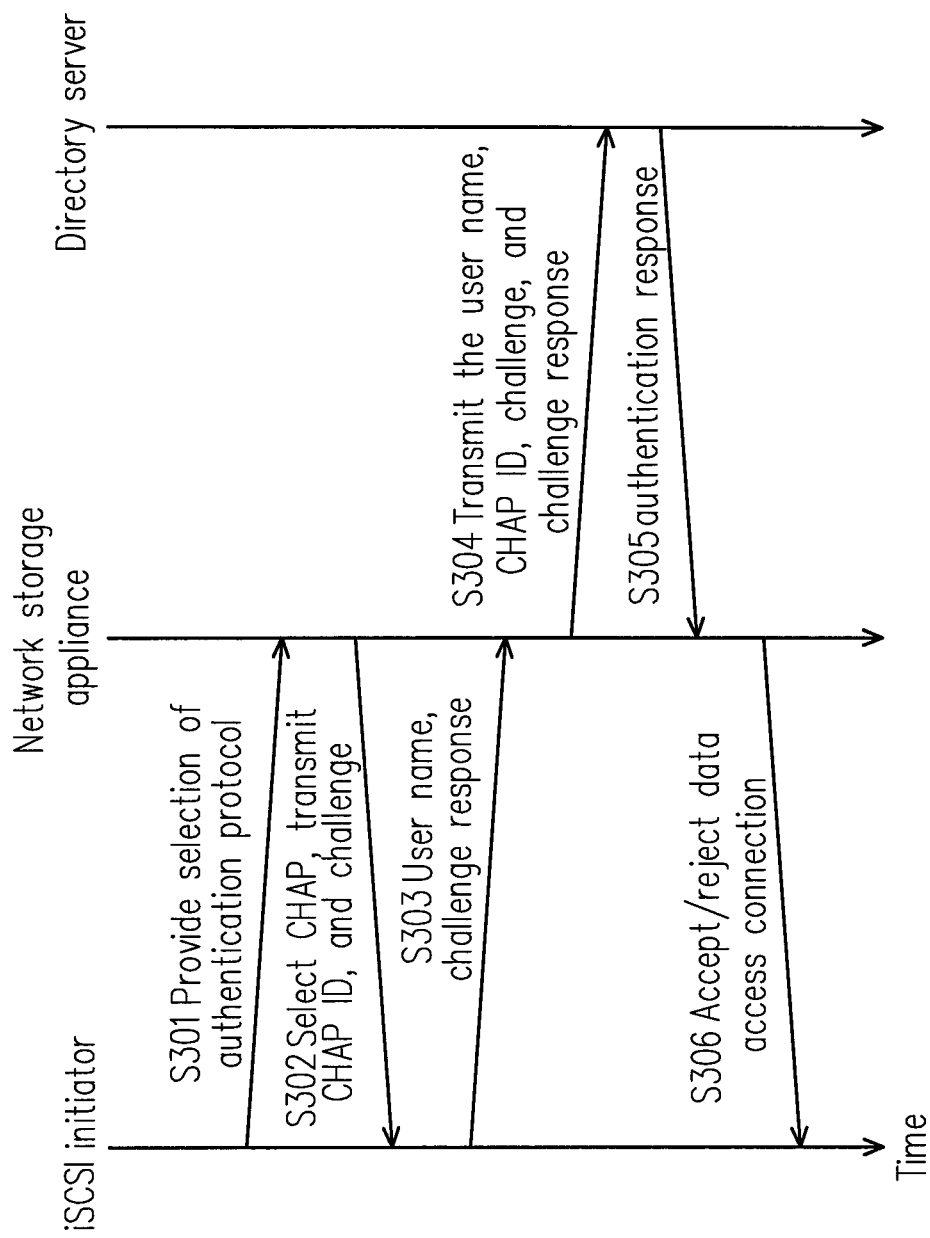
FIG. 3 is a time flowchart of an authentication method according to an embodiment of the invention.

FIG. 3 is a time flowchart of an authentication method according to an embodiment of the invention. Referring to FIG. 3, the authentication method in the present embodiment is adapted to the authentication system 200 illustrated in FIG. 2. Below, the authentication method in the present embodiment will be described in detail with reference to various components in FIG. 2.

In step S301, the client electronic device 210 transmits an authentication request to the network storage appliance 220. Specifically, if a user uses the client electronic device 210 and selects the iSCSI data access service, the iSCSI initiator 212 proposes the authentication protocols to be used to the iSCSI target 222 in the network storage appliance 220. In other words, during establishment of the iSCSI session, the iSCSI initiator 212 would negotiate the authentication protocol with the iSCSI target 222.

Then, in step S302, the network storage appliance 220 receives the authentication request, selects an authentication protocol according to the authentication request, and transmits one or a plurality of parameters required by the authentication protocol to the client electronic device 210. In the present embodiment, the network storage appliance 220 selects the CHAP authentication protocol and transmits a CHAP ID and a challenge to the iSCSI initiator 212.

Next, in step S303, the client electronic device 210 encrypts the parameters and the password input by the user by using a hashing algorithm, so as to generate the first encrypted data. Specifically, the iSCSI initiator 212 performs a calculation on the CHAP ID, the challenge, and the password input by the user by using the MD5 hashing algorithm, so as to generate a challenge response. Besides, the iSCSI initiator 212 transmits the user name and the challenge response (i.e., the first encrypted data) to the network storage appliance 220.

In step S304, the authentication proxy 221 packs the user name, the CHAP ID, the challenge, and the challenge response into an authentication login information and transmits the authentication login information to the directory server 230.

In step S305, the authentication service module 232 performs decryption and authentication comparison by using a Microsoft remote access authentication package corresponding to the CHAP authentication protocol. The authentication service module 232 first searches for a corresponding password in the account database 234 by using the user name and then performs a calculation on the CHAP ID and the challenge in the authentication login information and the password found in the account database 234 by using the same MD5 hashing algorithm, so as to generate a second encrypted data. After that, the authentication service module 232 compares the second encrypted data with the challenge response (i.e., the first encrypted data) in the authentication login information.

If the first encrypted data is the same as the second encrypted data, the authentication service module 232 transmits a positive response to the network storage appliance 220. If the first encrypted data is different from the second encrypted data, the authentication service module 232 transmits a negative response to the network storage appliance 220.

In the last step S306, the network storage appliance 220 notifies the client electronic device 210 about whether the iSCSI session is accepted or rejected.

Figure 4:
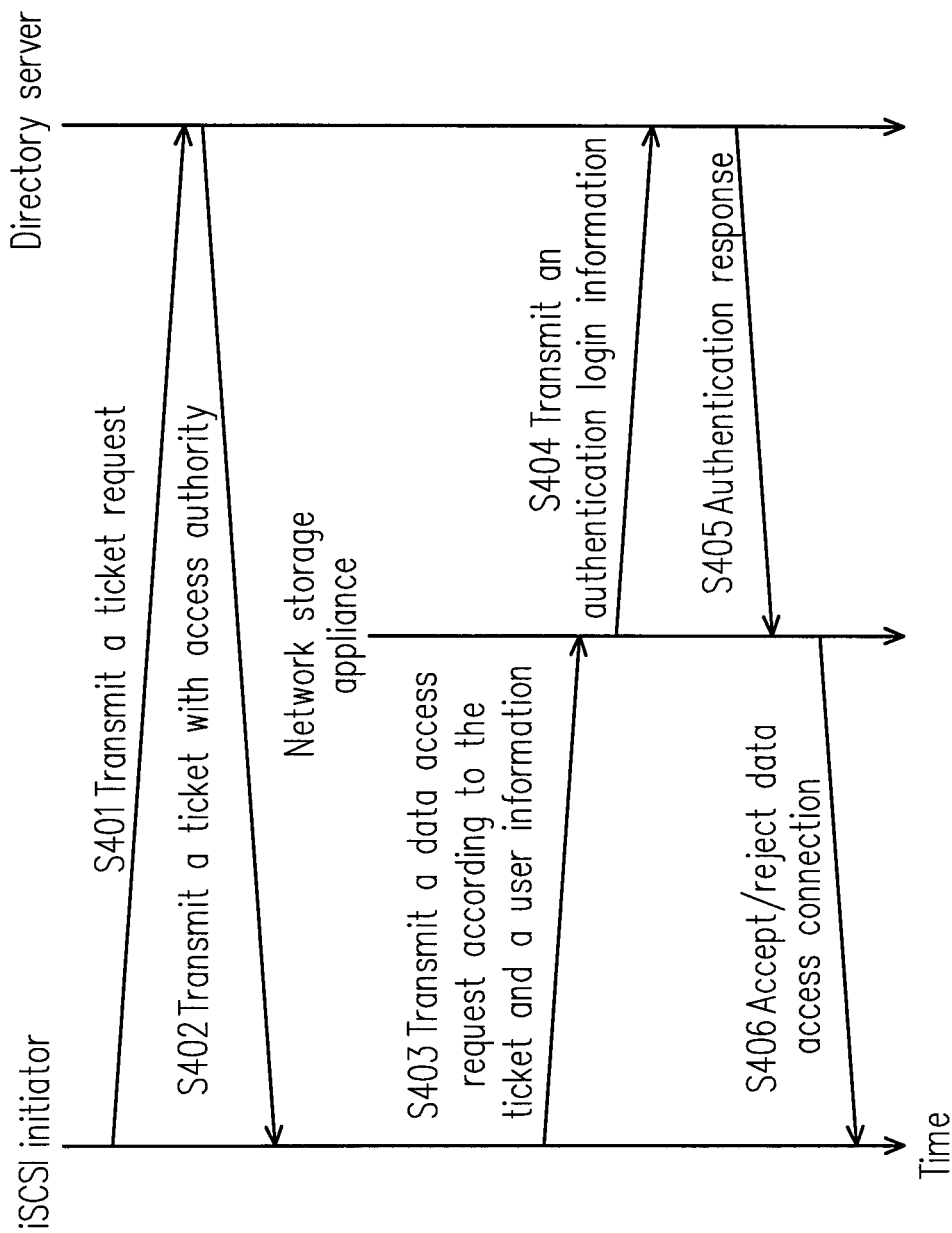
FIG. 4 is a flowchart of an authentication method according to another embodiment of the invention.

Below, the invention will be described with reference to another embodiment. FIG. 4 is a flowchart of an authentication method according to another embodiment of the invention. The authentication method in the present embodiment is adapted to the authentication system 200 illustrated in FIG. 2. Please refer to both FIG. 2 and FIG. 4 for following description.

In step S401, the client electronic device 210 transmits an authentication request. Since the client electronic device 210 selects the CIFS data access service, the CIFS client 214 first request a ticket for the directory server 230. Herein the ticket is related to an access authority of the client electronic device 210.

In step S402, the directory server 230 records the access authority of the client electronic device 210 into the ticket and transmits the ticket to the client electronic device 210.

In step S403, the client electronic device 210 issues a data access request to the network storage appliance 220 according to the ticket and user information.

In step S404, the authentication proxy 221 packs the user information and the Kerberos ticket into an authentication login information according to the Kerberos authentication protocol and transmits the authentication login information to the authentication service module 232 of the directory server 230.

In step S405, the authentication service module 232 performs decryption and authentication comparison on the authentication login information by using the Microsoft Kerberos authentication package. Besides, the directory server 230 transmits an authentication response to the network storage appliance 220.

In last step S406, the network storage appliance 220 notifies the client electronic device 210 about whether the access connection is accepted or rejected.

Figure 5:
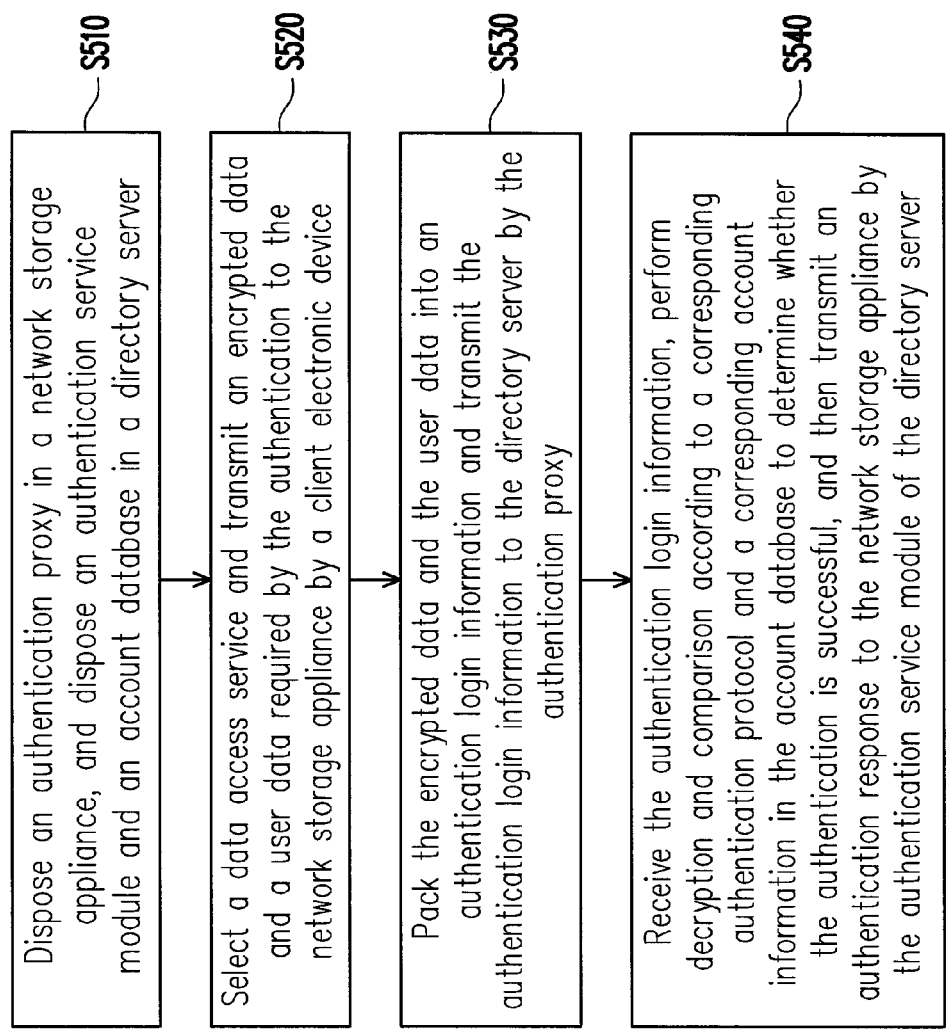
FIG. 5 is a flowchart of an authentication method according to yet another embodiment of the invention.
Figure 6:
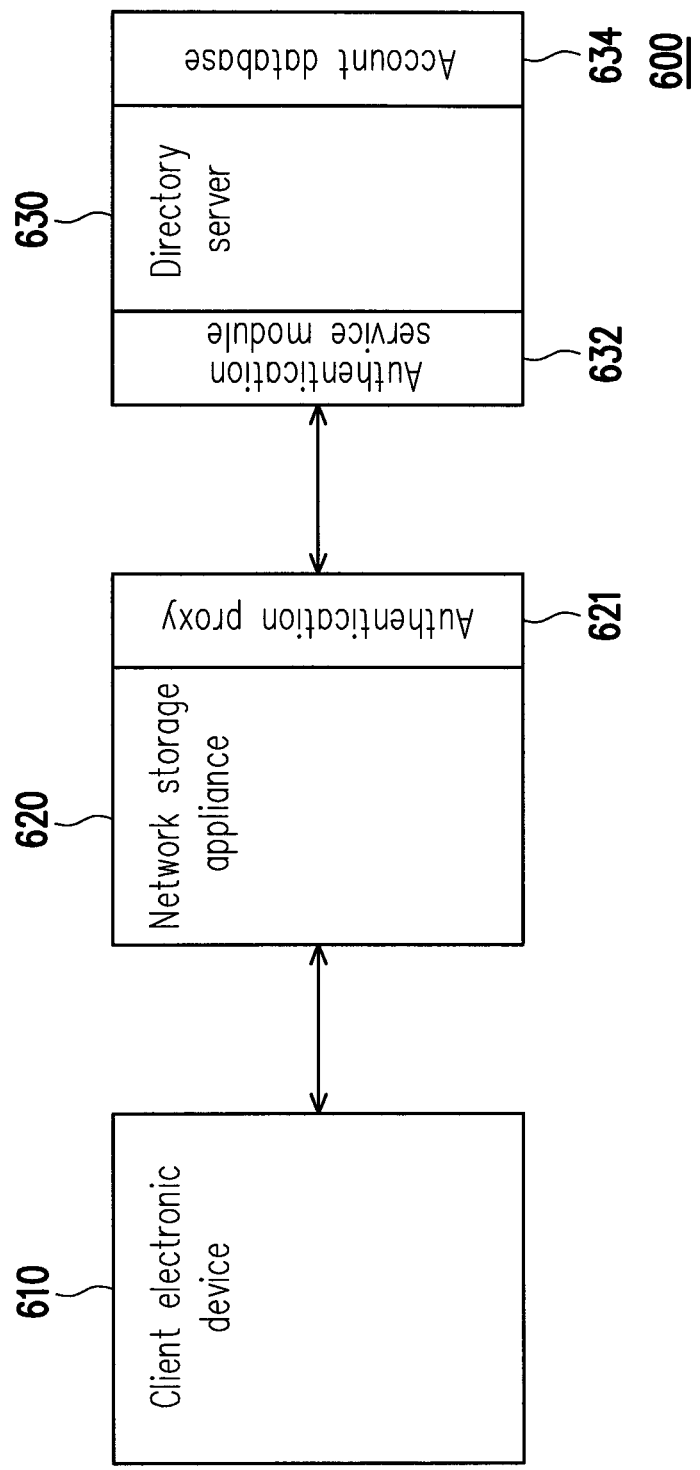
FIG. 6 is a block diagram of an authentication system according to yet another embodiment of the invention.

FIG. 5 is a flowchart of the authentication method described above according to yet another embodiment of the invention. FIG. 6 is a block diagram of an authentication system according to yet another embodiment of the invention. The authentication system 600 includes a client electronic device 610, a network storage appliance 620, and a directory server 630. Please refer to FIG. 5 and FIG. 6 for following description.

First, an authentication proxy 621 is disposed in the network storage appliance 620, and an authentication service module 632 and an account database 634 are disposed in the directory server 630 (step S510). The client electronic device 610 selects a data access service and transmits an encrypted data and a user data required by the authentication to the network storage appliance 620 (step S520). The authentication proxy 621 of the network storage appliance 620 packs the encrypted data and the user data into an authentication login information and transmits the authentication login information to the directory server 630 (step S530). The authentication service module 632 of the directory server 630 receives the authentication login information, wherein the authentication service module 632 performs decryption and comparison according to a corresponding authentication protocol and a corresponding account information in the account database 634 to determine whether the authentication is successful, and then the authentication service module 632 transmits an authentication response to the network storage appliance 620. The network storage appliance 620 notifies the client electronic device 610 about whether the access connection is accepted or rejected (step S540).

The authentication system in each embodiment described above has a directory server. Thus, through the operation of the authentication proxy in the network storage appliance, the authentication system in the invention can perform authentication comparison by using only the remote account database in the directory server. However, a local account database can still be configured in the network storage appliance such that when no directory server is deployed, the authentication system can perform authentication comparison by directly using the local account database since the network storage appliance can capture clear-text information. Namely, the network storage appliance in the invention allows a user to determine whether to perform authentication comparison by using a remote account database only or a local account database only.

As described above, according to the invention, an authentication system can perform a unified authentication (i.e., perform authentication comparison by using one and only one account database) through the operations of an authentication proxy in the network storage appliance and an authentication service module in the directory server. Thereby, the time required by a network system administrator for maintaining account database is greatly shortened. Since the user can perform the login authentication action by using the same ID and password regardless of which type of data access service the user selects, the possibility for the user to input incorrect ID or password is reduced, and accordingly the possibilities for authentication fail and denial of data access are reduced as well.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An authentication system, comprising:
   a client electronic device, receiving a password and a user data input by a user, wherein the password and the user data correspond to an account database;
   a network storage appliance, having an authentication proxy; and
   a directory server, connected to the network storage appliance via an internet network, and having an authentication service module and the account database,
   wherein the client electronic device selects a data access service and transmits a first encrypted data and the user data required by an authentication protocol to the network storage appliance, and the authentication proxy of the network storage appliance packs the first encrypted data and the user data into an authentication login information according to a type of the authentication protocol and transmits the authentication login information to the directory server,
   wherein the authentication service module of the directory server receives the authentication login information and performs decryption and comparison on the authentication login information according to the type of the authentication protocol and a corresponding account information in the account database, so as to determine whether an authentication is successful, and then the authentication service module transmits an authentication response to the network storage appliance.

2. The authentication system according to claim 1, wherein the client electronic device further transmits an authentication request to the network storage appliance, and the network storage appliance receives the authentication request, selects an authentication protocol according to the authentication request, and transmits at least one parameter required by the authentication protocol to the client electronic device.

3. The authentication system according to claim 2, wherein the client electronic device encrypts the parameters and a password input by a user by using a hashing algorithm to generate the first encrypted data, wherein the authentication proxy of the network storage appliance packs the first encrypted data, the parameters, and the user data into the authentication login information and transmits the authentication login information to the directory server.

4. The authentication system according to claim 3, wherein the authentication service module selects a password corresponding to the user data from the account database and encrypts the parameters and the password by using the same hashing algorithm, so as to generate a second encrypted data, and the authentication service module determines whether the authentication is successful by comparing the first encrypted data with the second encrypted data.

5. The authentication system according to claim 4, wherein when the authentication service module determines that the first encrypted data is the same as the second encrypted data, the authentication service module transmits a positive response to the network storage appliance, and when the authentication service module determines that the first encrypted data is different from the second encrypted data, the authentication service module transmits a negative response to the network storage appliance.

6. The authentication system according to claim 1, wherein the data access service comprises one of Internet Small Computer System Interface (iSCSI), Common Internet File System (CIFS), File Transfer Protocol (FTP), Apple Filing Protocol (AFP), HyperText Transfer Protocol (HTTP), and Network File System (NFS).

7. The authentication system according to claim 1, wherein the directory server is an active directory (AD) server of a Microsoft Windows operating system.

8. The authentication system according to claim 2, wherein the authentication protocol comprises one of Challenge-Handshake Authentication Protocol (CHAP), Kerberos Protocol, New Technology LAN Manager (NTLM), Digest Access Authentication, clear-text password, and encrypted password.

9. A network storage appliance, comprising:
an authentication proxy, packing an encrypted data and a user data from a client electronic device into an authentication login information according to a type of the authentication protocol and transmitting the authentication login information to a directory server having an account database, and receiving an authentication response indicating whether an authentication is successful from the directory server and transmitting an authentication result to the client electronic device,
wherein a password and the user data input by a user are received by the client electronic device, and the password and the user data correspond to the account database,
wherein the type of the authentication protocol is determined according to a data access service selected by the client electronic device,
wherein the authentication response is generated via performing decryption and comparison on the authentication login information according to the type of authentication protocol by the directory server.

10. The network storage appliance according to claim 9 further comprising:
at least one file server, coupled to the authentication proxy, receiving the encrypted data and the user data required by an authentication according to a data access service selected by the client electronic device, and transmitting the encrypted data and the user data to the authentication proxy to be packed.

11. The network storage appliance according to claim 10, wherein the data access service comprises one of iSCSI, CIFS, FTP, AFP, HTTP, and NFS.

12. The network storage appliance according to claim 9, wherein the network storage appliance is a storage appliance adopting a network attached storage (NAS) technique.

13. The network storage appliance according to claim 9, wherein the directory server is an AD server of a Microsoft Windows operating system.

14. An authentication method, adapted to an authentication system, wherein the authentication system comprises a client electronic device, a network storage appliance, and a directory server, the authentication method comprising:
receiving, by the client electronic device, a password and a user data input by a user, wherein the password and the user data correspond to an account database;
disposing an authentication proxy in the network storage appliance, and disposing an authentication service module and the account database in the directory server, wherein the directory server is connected to the network storage appliance via an internet network;
selecting a data access service and transmitting a first encrypted data and the user data required by an authentication protocol to the network storage appliance by the client electronic device;
packing the encrypted data and the user data into an authentication login information according to a type of the authentication protocol and transmitting the authentication login information to the directory server by the authentication proxy of the network storage appliance; and
receiving the authentication login information by the authentication service module of the directory server, wherein the authentication service module performs decryption and comparison according to the type of the authentication protocol and a corresponding account information in the account database, so as to determine whether an authentication is successful, and then the authentication service module transmits an authentication response to the network storage appliance.

15. The authentication method according to claim 14 further comprising:
transmitting an authentication request to the network storage appliance by the client electronic device; and
receiving the authentication request, selecting an authentication protocol according to the authentication request, and transmitting at least one parameter required by the authentication protocol to the client electronic device by the network storage appliance.

16. The authentication method according to claim 15, wherein the authentication protocol comprises one of CHAP, Kerberos Protocol, NTLM, Digest Access Authentication, clear-text password, and encrypted password.

17. The authentication method according to claim 15, wherein the step of packing the encrypted data and the user data into the authentication login information and transmitting the authentication login information to the directory server comprises:

encrypting the parameters and a password input by a user by using a hashing algorithm by the client electronic device, so as to generate the first encrypted data; and packing the first encrypted data, the parameters, and the user data into the authentication login information and transmitting the authentication login information to the directory server by the authentication proxy of the network storage appliance.

18. The authentication method according to claim 17, wherein the step of performing decryption and comparison according to the corresponding authentication protocol and the corresponding account information in the account database comprises:

selecting a password corresponding to the user data from the account database and encrypting the parameters and the password by using the same hashing algorithm by the authentication service module, so as to generate a second encrypted data; and determining whether the authentication is successful by comparing the first encrypted data with the second encrypted data.

19. The authentication method according to claim 18, wherein the step of determining whether the authentication is successful by comparing the first encrypted data with the second encrypted data comprises:

when the first encrypted data is the same as the second encrypted data, transmitting a positive response to the network storage appliance to indicate that the authentication is successful, and when the first encrypted data is different from the second encrypted data, transmitting a negative response to the network storage appliance to indicate that the authentication is not successful.

20. The authentication method according to claim 14, wherein the data access service comprises one of iSCSI, CIFS, FTP, AFP, HTTP, and NFS.

\* \* \* \* \*